United States Patent
Gettel

(10) Patent No.: US 9,549,610 B1
(45) Date of Patent: Jan. 24, 2017

(54) PICNIC TABLE STORAGE SYSTEM

(71) Applicant: Rodney Gettel, Longmont, CO (US)

(72) Inventor: Rodney Gettel, Longmont, CO (US)

( * ) Notice: Subject to any disclaimer, the term of this patent is extended or adjusted under 35 U.S.C. 154(b) by 0 days.

(21) Appl. No.: 15/130,502

(22) Filed: Apr. 15, 2016

(51) Int. Cl.
*A47B 3/00* (2006.01)
*A47B 31/04* (2006.01)
*A47B 37/04* (2006.01)

(52) U.S. Cl.
CPC ............... *A47B 31/04* (2013.01); *A47B 37/04* (2013.01)

(58) Field of Classification Search
CPC ........... A47B 31/06; A47B 31/04; A47B 5/00; A47B 37/04
USPC ............ 108/42, 44, 152; 297/147, 154, 135; 296/26.09, 26.01, 26.02
See application file for complete search history.

(56) References Cited

U.S. PATENT DOCUMENTS

| | | | | |
|---|---|---|---|---|
| 2,471,730 A | * | 5/1949 | Doerr | B60N 3/001 108/33 |
| 2,545,269 A | * | 3/1951 | Ford | A47B 88/10 224/42.32 |
| 3,394,666 A | | 7/1968 | Pearlman | |
| 3,940,175 A | | 2/1976 | Robison | |
| 4,511,174 A | | 4/1985 | Walker | |
| 4,824,163 A | * | 4/1989 | Hendrych | B60P 7/02 108/34 |
| 4,915,437 A | * | 4/1990 | Cherry | B60R 11/06 108/44 |
| 5,040,467 A | * | 8/1991 | King | E04B 1/34336 108/42 |
| 5,540,158 A | | 7/1996 | Ford | |
| 5,730,066 A | | 3/1998 | Auten et al. | |
| 5,899,518 A | * | 5/1999 | Schreiner | B60P 3/36 108/44 |
| 5,934,726 A | | 8/1999 | Bossett | |
| 6,145,447 A | | 11/2000 | Henderson | |
| D466,469 S | * | 12/2002 | Nelson, Jr. | D12/221 |
| D475,678 S | | 6/2003 | Evans | |
| 6,883,849 B2 | * | 4/2005 | Hebert | B60P 1/003 224/403 |
| 6,929,302 B1 | * | 8/2005 | Demick | B60P 3/341 296/170 |
| 7,309,202 B1 | * | 12/2007 | Anderson | B60P 1/431 108/44 |
| 7,410,205 B2 | * | 8/2008 | Cardwell | B60P 3/36 296/162 |
| 7,628,439 B1 | * | 12/2009 | Strong | B62D 33/0273 108/44 |
| 8,256,818 B1 | | 9/2012 | Tovani | |
| 8,424,946 B2 | * | 4/2013 | Newberg | B60R 5/04 108/44 |
| 2002/0180231 A1 | * | 12/2002 | Fox | B62D 33/0273 296/26.01 |

* cited by examiner

*Primary Examiner* — Jose V Chen

(57) ABSTRACT

A picnic table storage system includes a collapsible table that has a deck and a system of collapsible legs. A frame is provided and the frame may be suspended from a vehicle. A box is slidably coupled to the frame such that the box may be positioned beneath the vehicle. The collapsible table is insertable into the box such that the collapsible table is stored within the box.

5 Claims, 5 Drawing Sheets

PICNIC TABLE STORAGE SYSTEM

BACKGROUND OF THE DISCLOSURE

Field of the Disclosure

The disclosure relates to storage devices and more particularly pertains to a new storage device for storing a collapsible picnic table on a vehicle.

SUMMARY OF THE DISCLOSURE

An embodiment of the disclosure meets the needs presented above by generally comprising a collapsible table that has a deck and a system of collapsible legs. A frame is provided and the frame may be suspended from a vehicle. A box is slidably coupled to the frame such that the box may be positioned beneath the vehicle. The collapsible table is insertable into the box such that the collapsible table is stored within the box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
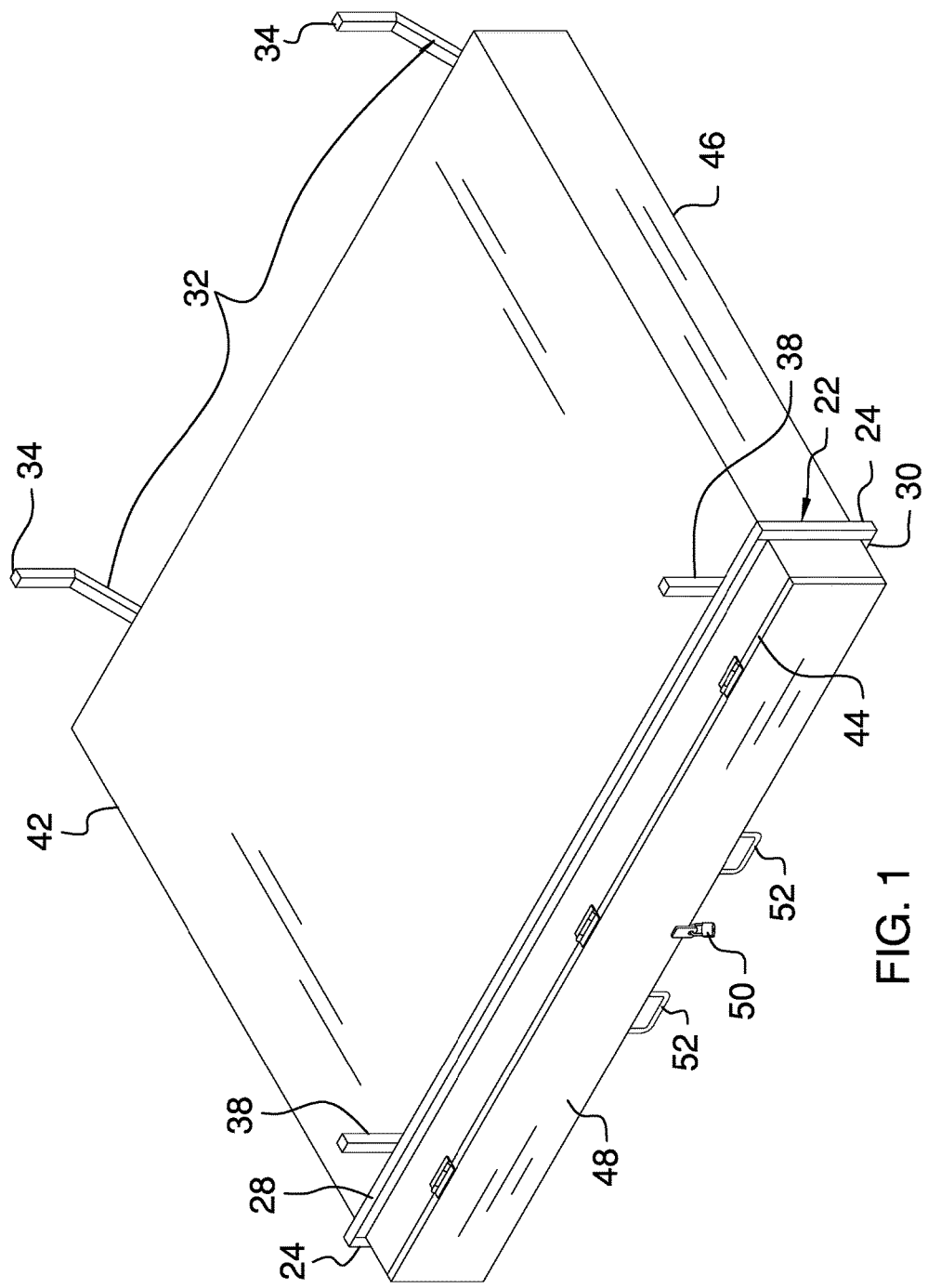
FIG. 1 is a front perspective view of a picnic table storage system according to an embodiment of the disclosure.
Figure 2:
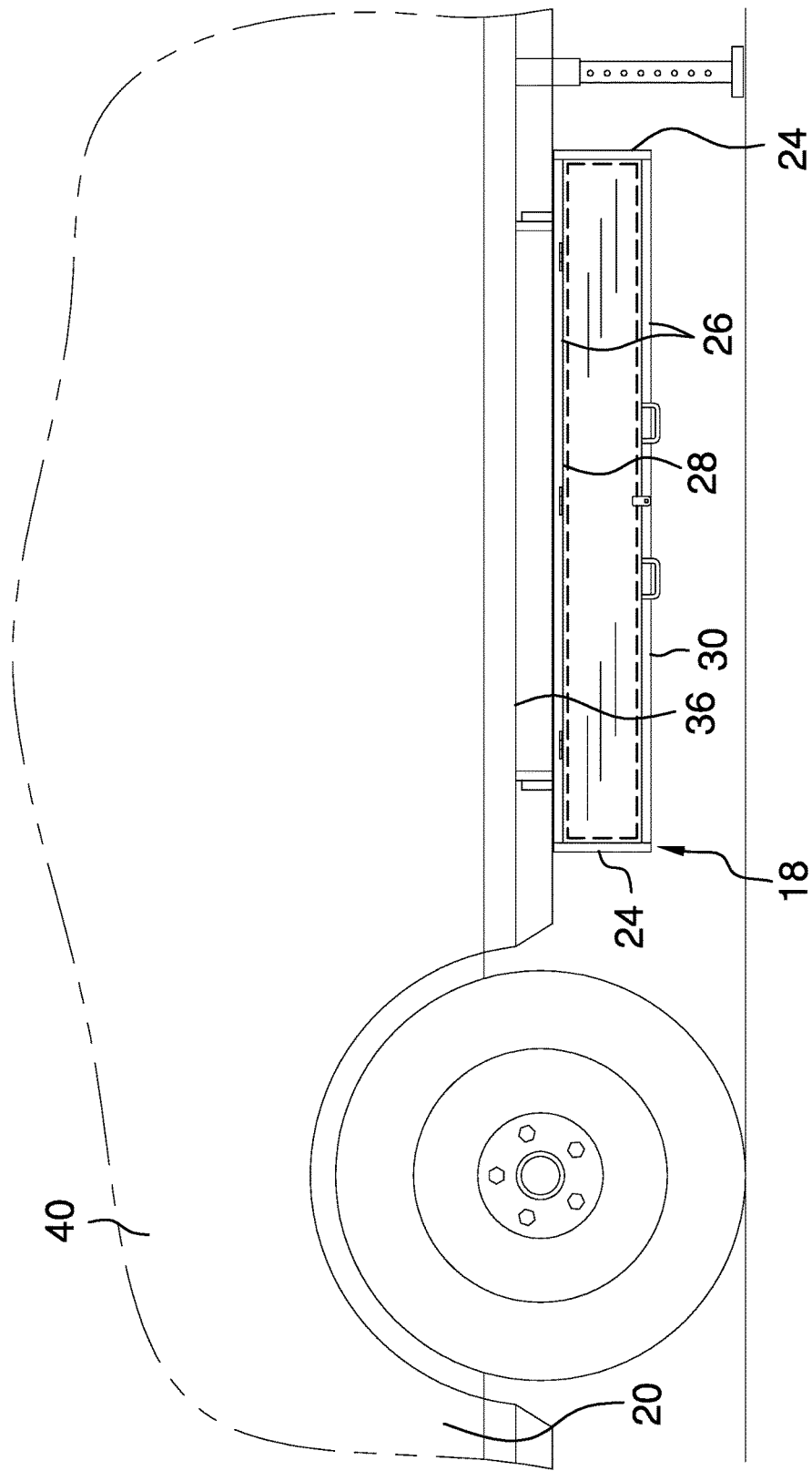
FIG. 2 is a side in-use view of an embodiment of the disclosure.
Figure 3:
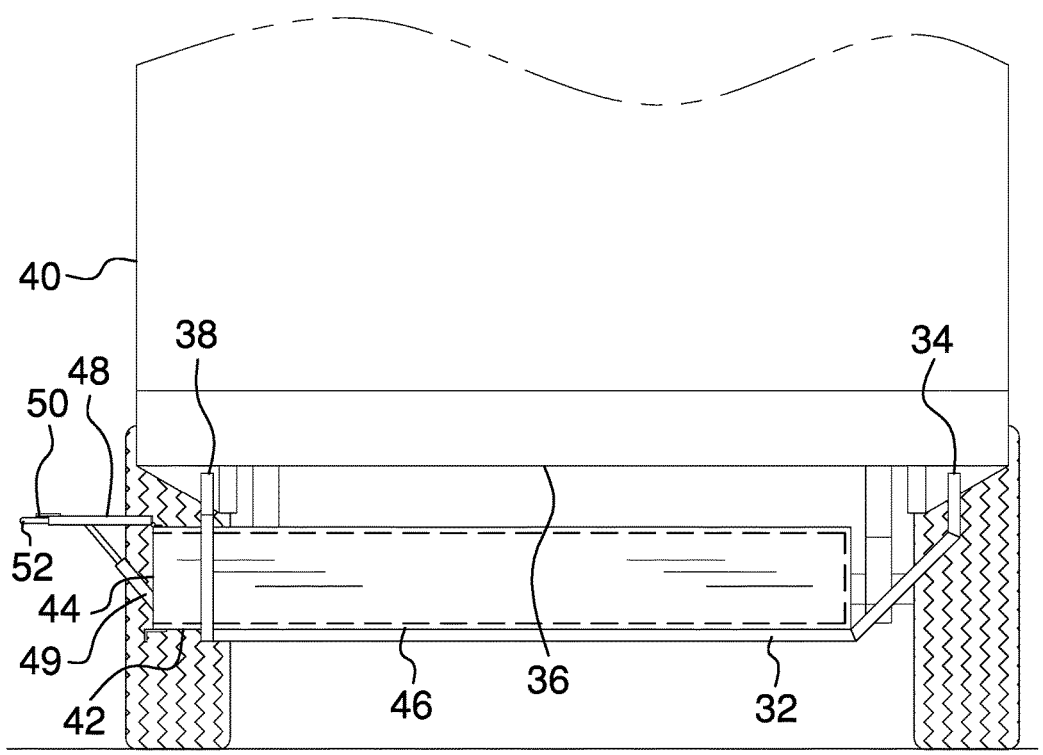
FIG. 3 is a back in-use view of an embodiment of the disclosure.
Figure 4:
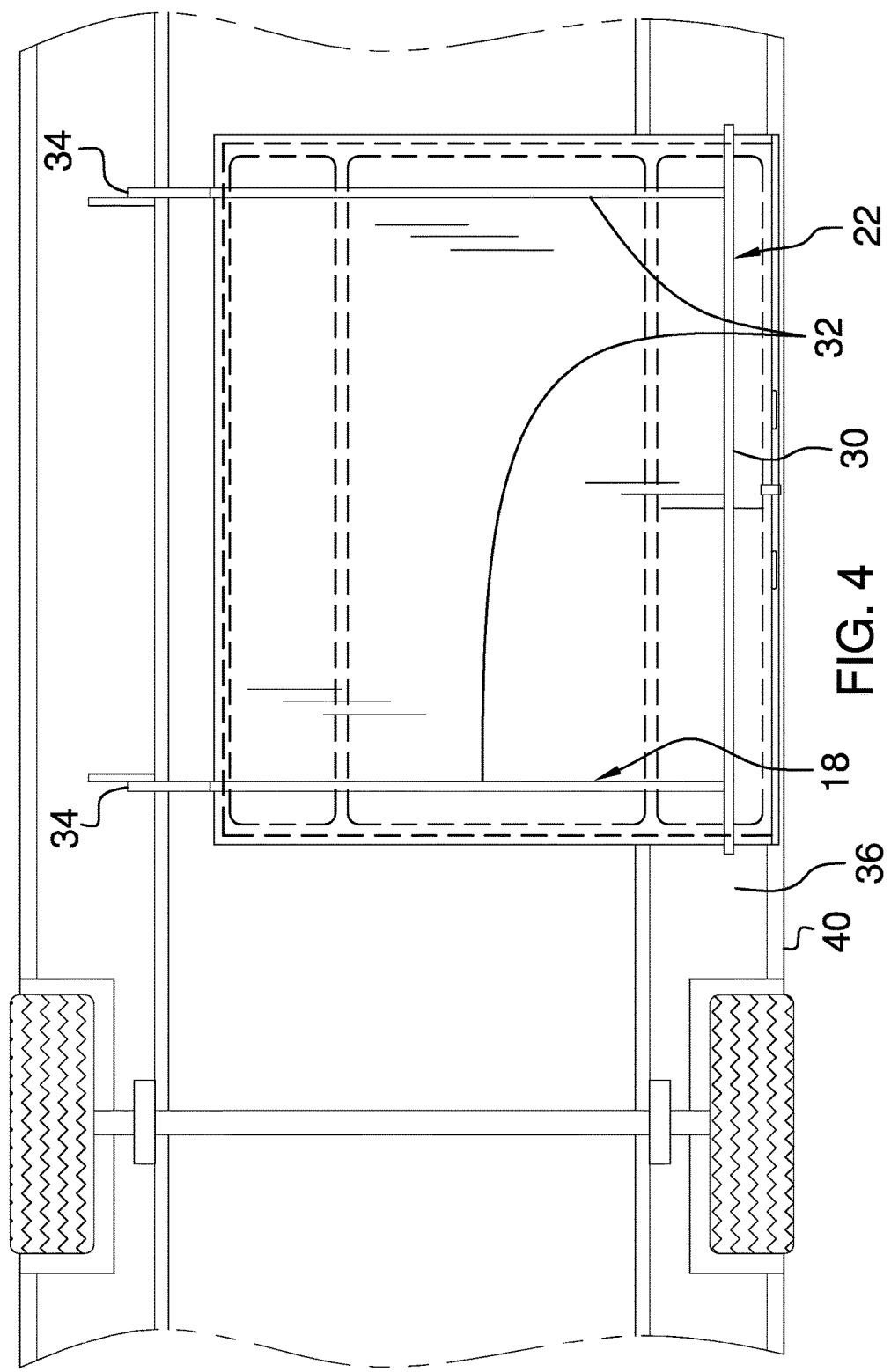
FIG. 4 is a bottom in-use view of an embodiment of the disclosure.
Figure 5:
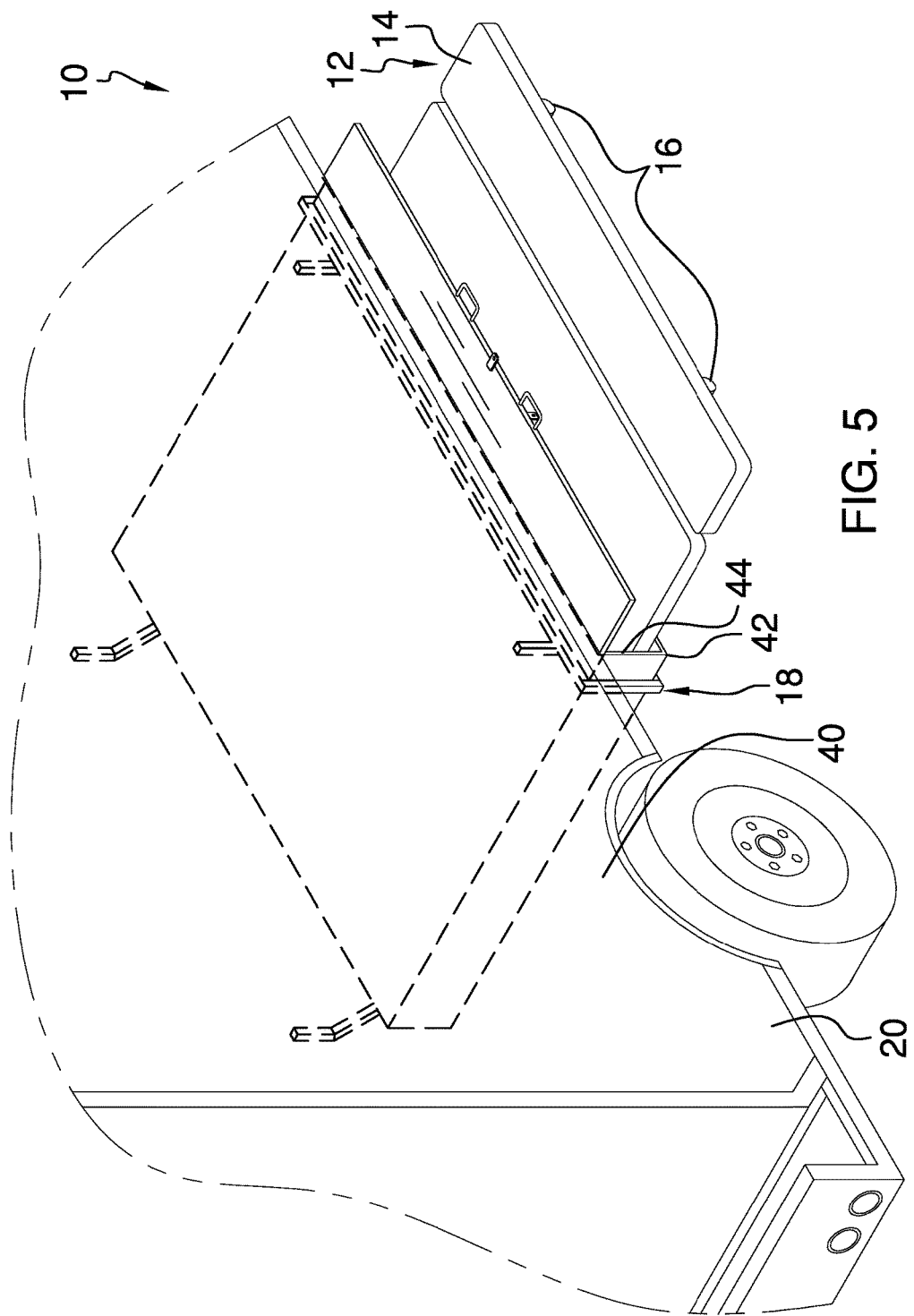
FIG. 5 is a side perspective in-use view of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the picnic table storage system 10 generally comprises a collapsible table 12 that has a deck 14 and a system of collapsible legs 16. The system of collapsible legs 16 is movably coupled to the deck 14. The collapsible table 12 may be a collapsible picnic table or the like. A frame 18 is provided and the frame 18 is coupled to a vehicle 20. The vehicle 20 may comprise a recreational vehicle such as a motorized camper or the like.

The frame 18 comprises a box section 22. The box section 22 has a pair of longitudinal arms 24 that are coupled between a pair of lateral arms 26. The longitudinal arms 24 are spaced apart from each other and define an upper lateral arm 28 and a lower lateral arm 30. A pair of support arms 32 is provided and each of the support arms 32 is coupled to and extends away from the lower lateral arm 30. The pair of support arms 32 is spaced apart from each other on the lower lateral arm 30.

Each of the support arms 32 has a distal end 34 with respect to the lower lateral arm 30. The distal end 34 corresponding to each of the support arms 32 is directed upwardly from the corresponding support arm 32. The distal end 34 corresponding to each of the support arms 32 may be coupled to a bottom side 36 of the vehicle 20. The support arms 32 may be welded, bolted or coupled to the vehicle 20 with any conventional means.

A pair of uprights 38 is provided. Each of the uprights 38 is coupled to and extends upwardly from the upper lateral arm 28. The uprights 38 are spaced apart from each other on the upper lateral arm 28. Each of the uprights 38 may be coupled to the bottom side 36 of the vehicle 20. Thus, the frame 18 is suspended beneath the vehicle 20. The frame 18 is positioned to substantially align the box section 22 with a lateral side 40 of the vehicle 20.

A box 42 is slidably coupled to the frame 18. Thus, the box 42 is positioned beneath the vehicle 20. The collapsible table 12 is insertable into the box 42 such that the collapsible table 12 is stored within the box 42. The box 42 has a front side 44 and a bottom side 46, and the front side 44 is open to access an interior of the box 42.

The box 42 extends through the box section 22 of the frame 18. The bottom side 46 of the box 42 lies on each of the support arms 32 such that the box 42 is removably positioned on the frame 18. The front side 44 of the box 42 is accessible from the lateral side 40 of vehicle 20. A lid 48 is hingedly coupled to the box 42 and the lid 48 is positioned on the front side 44. At least one strut 49 may be provided and the at least one strut 49 is coupled between the lid 48 and the box 42. The at least one strut 49 urges the lid 48 to remain in an open position. The at least one strut 49 may comprise a gas charged piston or the like.

A lock 50 is coupled between the lid 48 and the box 42. The lock 50 may include a padlock or the like. The lock 50 selectively retains the lid 48 in a closed position. A pair of handles 52 is coupled to the lid 48. Each of the handles 52 may be gripped to manipulate the lid 48 between an open position and a closed position.

In use, the frame 18 is coupled to the vehicle 20 and the box 42 is positioned in the frame 18. The collapsible table 12 is collapsed and the collapsible table 12 is inserted into the front side 44 of the box 42. The lid 48 is positioned in the closed position and the collapsible table 12 is stored in the box 42. Thus, the collapsible table 12 does not occupy space within the vehicle 20 when the collapsible table 12 is being stored. The lid 48 is positioned in the open position and the collapsible table 12 is removed from the box 42. Thus, the collapsible table 12 is useable.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A picnic table storage system comprising:
a collapsible table having a deck and a system of collapsible legs being movably coupled to said deck;
a frame being configured to be coupled to a vehicle;
a box being slidably coupled to said frame wherein said box is configured to be positioned beneath the vehicle, said collapsible table being insertable into said box such that said collapsible table is stored within said box; and
wherein said frame comprises a box section having a pair of longitudinal arms being coupled between a pair of lateral arms to define said box section, said longitudinal arms being spaced apart from each other.

2. The system according to claim 1, further comprising a pair of support arms, each of said support arms being coupled to and extending away from one of said lateral arms, said pair of support arms being spaced apart from each other on a lower one of said lateral arms, each of said support arms having a distal end with respect to said lower one of said lateral arms, said distal end corresponding to each of said support arms being directed upwardly from said corresponding support arm wherein said distal end corresponding to each of said support arms is configured to be coupled to a bottom side of the vehicle.

3. The system according to claim 1, further comprising a pair of uprights, each of said uprights being coupled to and extending upwardly from an upper one of said lateral arms, said uprights being spaced apart from each other on said upper one of said lateral arms, each of said uprights being configured to be coupled to the bottom side of said vehicle thereby facilitating said frame to be suspended beneath the vehicle.

4. A picnic table storage system comprising:
a collapsible table having a deck and a system of collapsible legs being movably coupled to said deck;
a frame being configured to be coupled to a vehicle;
a box being slidably coupled to said frame wherein said box is configured to be positioned beneath the vehicle, said collapsible table being insertable into said box such that said collapsible table is stored within said box;
wherein said frame includes a box section and a pair of supports arms; and
wherein said box has a front side and a bottom side, said front side being open to access an interior of said box, said box extending through said box section such that said bottom side is positioned on each of said support arms such that said box is removably positioned on said frame wherein said front side is configured to be accessible.

5. A picnic table storage system comprising:
a collapsible table having a deck and a system of collapsible legs being movably coupled to said deck; and
a frame being configured to be coupled to a vehicle, said frame comprising:
a box section having a pair of longitudinal arms being coupled between a pair of lateral arms, said longitudinal arms being spaced apart from each other,
a pair of support arms, each of said support arms being coupled to and extending away from a lower one of said lateral arms, said pair of support arms being spaced apart from each other on said lower one of said lateral arms, each of said support arms having a distal end with respect to said lower one of said lateral arms, said distal end corresponding to each of said support arms being directed upwardly from said corresponding support arm wherein said distal end corresponding to each of said support arms is configured to be coupled to a bottom side of the vehicle, and
a pair of uprights, each of said uprights being coupled to and extending upwardly from an upper one of said lateral arms, said uprights being spaced apart from each other on said upper one of said lateral arms, each of said uprights being configured to be coupled to the bottom side of said vehicle thereby facilitating said frame to be suspended beneath the vehicle; and
a box being slidably coupled to said frame wherein said box is configured to be positioned beneath the vehicle, said collapsible table being insertable into said box such that said collapsible table is stored within said box, said box having a front side and a bottom side, said front side being open to access an interior of said box, said box being extendable through said box section such that said bottom side is positioned on each of said support arms such that said box is removably positioned on said frame wherein said front side is configured to be accessible; and
a lid being hingedly coupled to said box, said lid being positioned on said front side.

* * * * *